United States Patent
Choi et al.

(10) Patent No.: US 8,334,855 B2
(45) Date of Patent: Dec. 18, 2012

(54) ELECTRONIC PEN FOR DETECTING TOUCH LOCATION AND METHOD AND APPARATUS FOR DETECTING TOUCH LOCATION

(75) Inventors: Im-Su Choi, Suwon-si (KR); Hyun-Chul Do, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 532 days.

(21) Appl. No.: 12/646,955

(22) Filed: Dec. 23, 2009

(65) Prior Publication Data

US 2010/0315357 A1   Dec. 16, 2010

(30) Foreign Application Priority Data

Jun. 15, 2009   (KR) .................. 10-2009-0052901

(51) Int. Cl.
*G06F 3/033* (2006.01)
*G09G 3/28* (2006.01)

(52) U.S. Cl. ....... 345/179; 345/60; 345/173; 178/18.01; 178/19.01

(58) Field of Classification Search .................. None
See application file for complete search history.

(56) References Cited

U.S. PATENT DOCUMENTS

| | | | |
|---|---|---|---|
| 4,277,783 A | 7/1981 | Sampieri et al. | |
| 5,717,168 A * | 2/1998 | DeBuisser et al. | 178/18.04 |
| 6,437,314 B1 | 8/2002 | Usuda et al. | |
| 7,098,894 B2 * | 8/2006 | Yang et al. | 345/166 |

FOREIGN PATENT DOCUMENTS

| | | |
|---|---|---|
| JP | 52-060034 | 5/1977 |
| JP | 06-314166 | 11/1994 |
| JP | 10-143323 | 5/1998 |
| JP | 2000-020237 | 1/2000 |
| JP | 2000284895 A | 10/2000 |
| JP | 2001-100917 | 4/2001 |
| JP | 2002062978 | 2/2002 |
| KR | 1019950006575 A | 3/1995 |
| KR | 1020020073028 A | 9/2002 |

OTHER PUBLICATIONS

Korean Registration Determination Certificate dated Sep. 30, 2010, for Priority Korean Application. 10-2009-0052901.
English Machine Translation of Japanese Publication 2002-062978A.
English Machine Translation of Korean Publication 10-1995-0006575A.

* cited by examiner

*Primary Examiner* — Andrew L Sniezek
(74) *Attorney, Agent, or Firm* — Christie, Parker & Hale, LLP

(57) ABSTRACT

An electronic pen for detecting a touch location on a display panel by detecting infrared rays generated by the display panel, the electronic pen including an infrared sensor that detects the infrared rays and generates a detection signal; an amplifying unit that amplifies the detection signal; a low pass filter that filters high-frequency elements from the amplified detection signal; and a location detecting unit that detects the location on the display panel touched by the electronic pen based on the filtered detection signal.

20 Claims, 5 Drawing Sheets

ELECTRONIC PEN FOR DETECTING TOUCH LOCATION AND METHOD AND APPARATUS FOR DETECTING TOUCH LOCATION

CROSS-REFERENCE TO RELATED APPLICATION

This application claims priority to and the benefit of Korean Patent Application No. 10-2009-0052901, filed on Jun. 15, 2009, in the Korean Intellectual Property Office, the entire content of which is incorporated herein by reference.

BACKGROUND

1. Field

One or more embodiments of the present invention relate to an electronic pen for detecting a touch location and a method and an apparatus for detecting a touch location.

2. Description of the Related Art

A user may use a remote controller or a mouse to apply an operation signal to a display apparatus, such as a TV or a monitor. Furthermore, electronic pens for directly drawing on and/or applying operation signals to display apparatuses may be provided. To operate such an electronic pen, a technique for detecting whether an object touches a display panel or not and a technique for detecting a location at which the object is touched is used.

In one example, a method of detecting a location touched by an electronic pen includes generating either infrared rays or ultrasonic waves using the electronic pen and detecting the infrared rays or the ultrasonic waves at a display panel. However, this method requires an additional device on the display panel, and thus manufacturing cost increases.

In another example, a method of detecting a location touched by an electronic pen includes detecting infrared rays generated when the electronic pen touches a display panel. This method requires no additional device on the display panel. However, since this method detects infrared rays generated by the scans of a display panel on its scan electrodes, it is difficult to accurately detect the location touched by the pen when the electronic pen touches a location between scan electrodes.

SUMMARY OF THE INVENTION

Aspects of embodiments of the present invention are directed toward an electronic pen for detecting a touch location capable of improving resolution of touch detection and a method and an apparatus for detecting a touch location.

An embodiment of the present invention provides an electronic pen for detecting a touch location on a display panel by detecting infrared rays generated by the display panel, the electronic pen including an infrared sensor that detects the infrared rays and generates a detection signal; an amplifying unit that amplifies the detection signal; a low pass filter that filters high-frequency elements from the amplified detection signal; and a location detecting unit that detects the location on the display panel touched by the electronic pen based on the filtered detection signal.

The location detecting unit may further include a comparing unit that compares the filtered detection signal to a reference value, and the location detecting unit may determine that the electronic pen touches the display panel only when a value of the filtered detection signal is greater than the reference value.

The location detecting unit may further include a time measuring unit that measures a time difference between a scanning starting time point at which scanning in the display panel started and a time point at which the infrared rays are detected; and a location calculating unit that calculates the location touched by the electronic pen based on the time difference measured by the time measuring unit.

The time point at which the infrared rays are detected may be a time point at which the filtered detection signal has a peak value.

The electronic pen may further include a communication unit that transmits information regarding the detected touch location to the display panel.

The display panel may be a plasma display panel.

Another embodiment of the present invention provides a method of detecting a location on a display panel touched by an electronic pen by detecting infrared rays generated by the display panel, the method including detecting the infrared rays and generating a detection signal; amplifying the detection signal; filtering high-frequency elements from the amplified detection signal; and detecting the location touched by the electronic pen based on the filtered detection signal.

The detecting of the location may include comparing the filtered detection signal to a reference value, and it may be determined that the display panel is touched by the electronic pen only when a value of the filtered detection signal is greater than the reference signal.

The detecting of the location may include measuring a time difference between a scanning starting time point at which scanning in the display panel started and a time point at which the infrared rays are detected; and calculating the location touched by the electronic pen based on the measured time difference.

The time point at which the infrared rays are detected may be a time point at which the filtered detection signal has a peak value.

The method may further include transmitting information regarding the detected touch location to the display panel.

The display panel may be a plasma display panel.

Another embodiment of the present invention provides an apparatus for detecting a touch location, the apparatus including a plasma display panel, which includes scan electrodes and sustain electrodes that extend parallel to each other; and address electrodes that extend perpendicularly across the scan electrodes and the sustain electrodes, an electronic pen for detecting a location touched by the electronic pen by detecting infrared rays generated by the plasma display panel, wherein the electronic pen includes an infrared sensor that detects the infrared rays and generates a detection signal; an amplifying unit that amplifies the detection signal; a low pass filter that filters high-frequency elements from the amplified detection signal; and a location detecting unit that detects the location on the plasma display panel touched by the electronic pen based on the filtered detection signal.

A unit frame of the plasma display panel may be divided into a plurality of sub-fields to display gradation and a location detection scanning period.

The location detection scanning period may include an X coordinate scanning period and a Y coordinate scanning period. Location scanning signals may be sequentially applied to the scan electrodes during the X coordinate scanning period, and location scanning signals may be sequentially applied to the address electrodes during the Y coordinate scanning period.

The infrared sensor may detect infrared rays generated by the plasma display panel due to the application of the location scanning signals.

The location detecting unit may further include a comparing unit that compares the filtered detection signal to a reference value, and the location detecting unit may determine that the electronic pen touches the plasma display panel only when a value of the filtered detection signal is greater than the reference value.

The location detecting unit may further include a time measuring unit that measures a time difference between a scanning starting time point at which scanning in the plasma display panel started and a time point at which the infrared rays are detected; and a location calculating unit that calculates the location touched by the electronic pen based on a time difference measured by the time measuring unit.

The time point at which the infrared rays are detected may be a time point at which the filtered detection signal has a peak value, and the scanning starting time point may be a time point at which scanning starts for either the X coordinate scanning period or the Y coordinate scanning period.

The apparatus may further include a communication unit that transmits information regarding the detected touch location to the plasma display panel.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
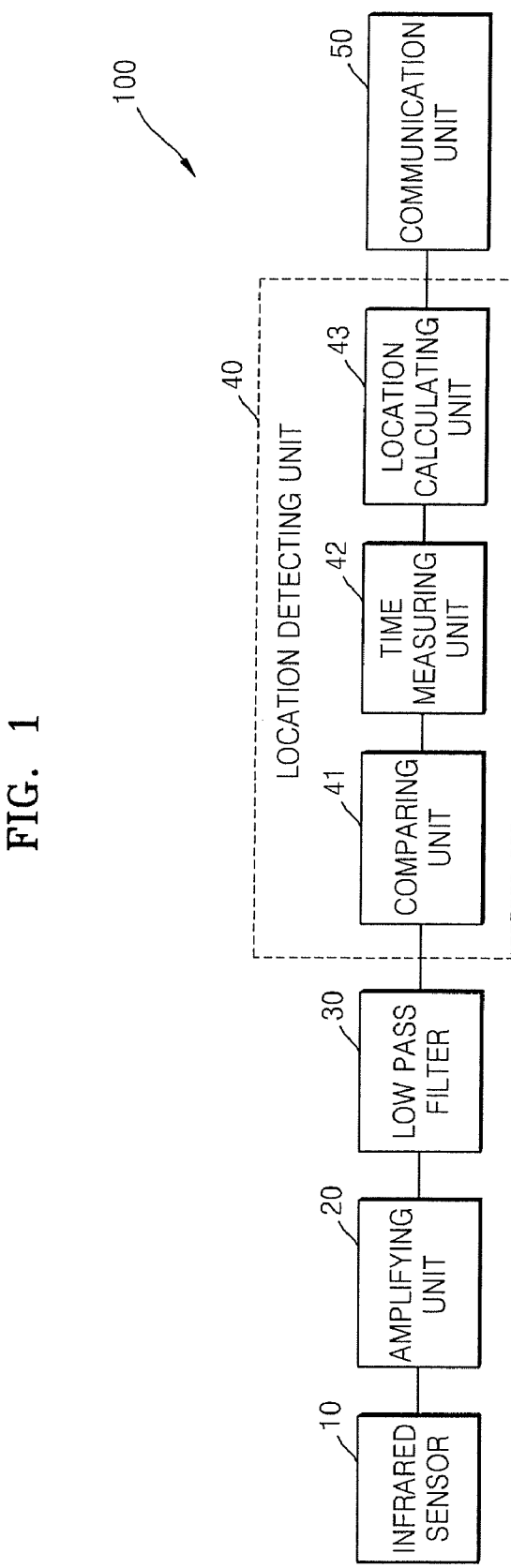
FIG. 1 is a schematic block diagram of an electronic pen for detecting a touch location according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
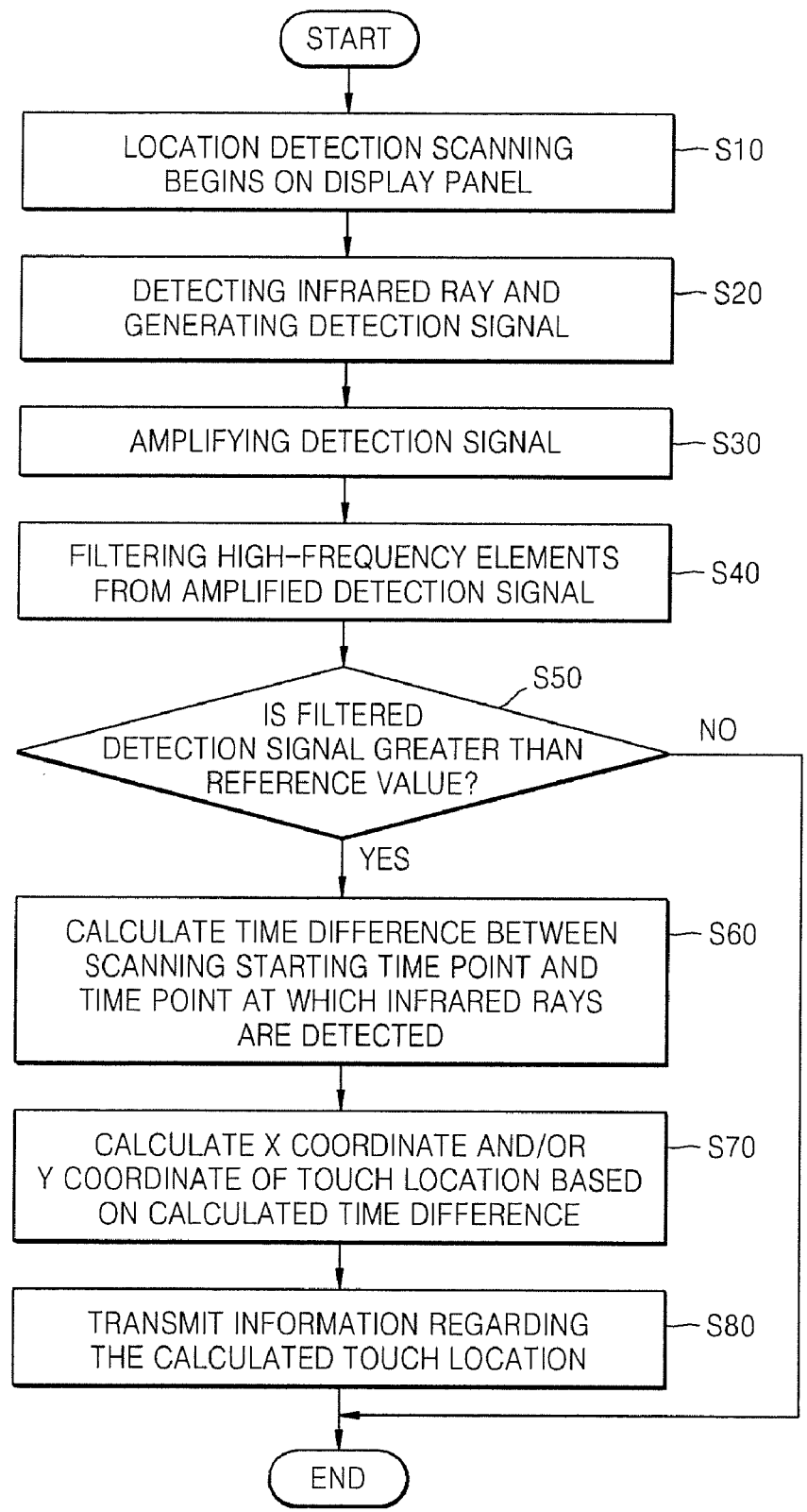
FIG. 2 is a flowchart of a method of detecting a touch location using the electronic pen of FIG. 1 according to an embodiment of the present invention.
Figure 3A:
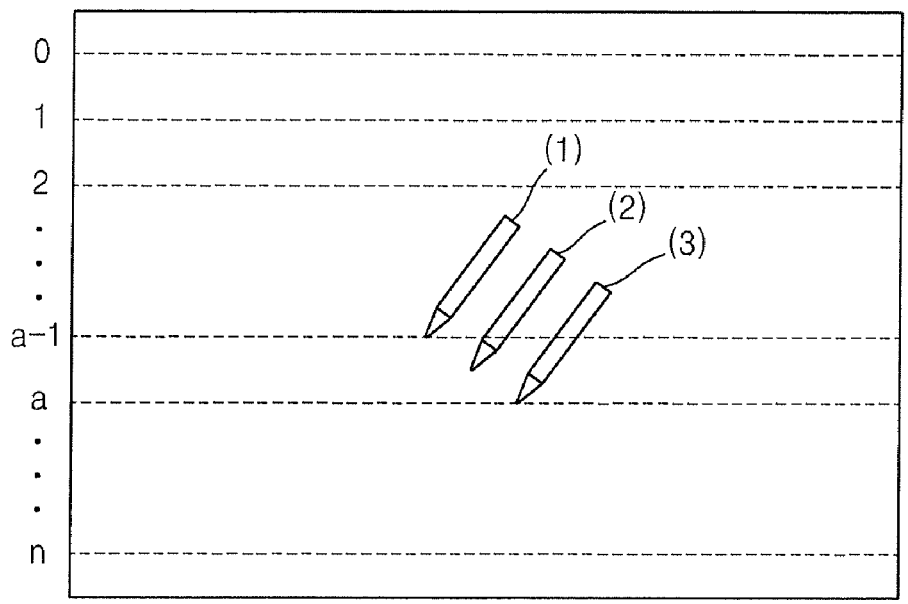
FIG. 3A is a schematic diagram showing a display panel that is touched by the electronic pen of FIG. 1.
Figure 3B:
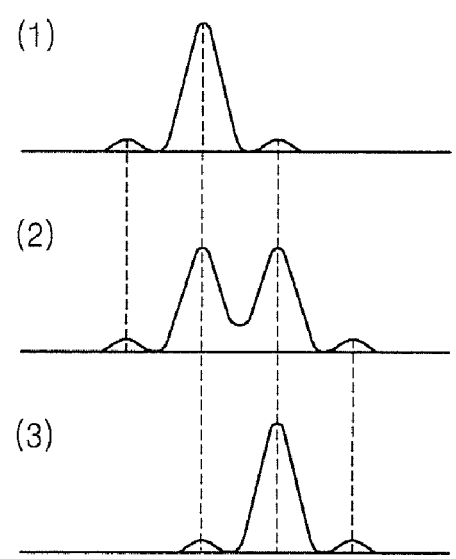
FIG. 3B is a diagram showing waveforms of signals that are generated by an infrared sensor, before the signals are filtered.
Figure 3C:
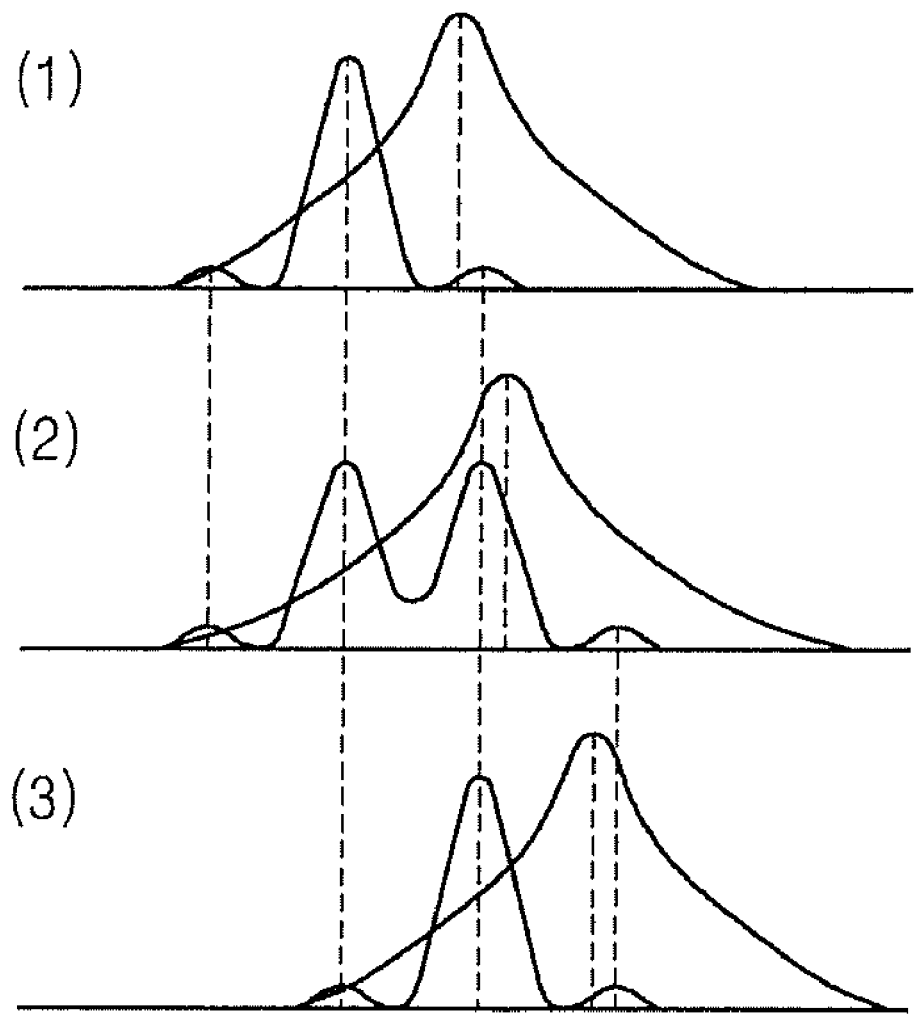
FIG. 3C is a diagram showing waveforms of signals that are generated by an infrared sensor, after the signals are filtered.

FIG. 1 is a schematic block diagram of an electronic pen 100 for detecting a touch location according to an embodiment of the present invention, and FIG. 2 is a flowchart of a method of detecting a touch location using the electronic pen 100 of FIG. 1 according to an embodiment of the present invention. FIG. 3A is a schematic diagram showing a display panel that is touched by the electronic pen 100 of FIG. 1. FIGS. 3B and 3C are diagrams showing waveforms of signals that are generated by an infrared sensor, before and after the signals are filtered, respectively.

Referring to FIG. 1 through FIG. 3C, the electronic pen 100 for detecting a touch location includes an infrared sensor 10, an amplifying unit 20, a low pass filter (LPF) 30, a location detecting unit 40, and a communication unit 50.

The infrared sensor 10 detects infrared rays generated by a display panel and generates a detection signal. The detection signal may be either a current generated by the infrared sensor 10 according to intensity of the infrared rays, or a voltage corresponding to the current. When location scanning signals for detecting a location touched by the electronic pen 100 on a display panel (e.g., a plasma display panel (PDP)) are sequentially applied to scan electrodes, infrared rays are generated by the scan electrodes, and the infrared sensor 10 may detect such infrared rays. Here, the location scanning signals may be signals applied to electrodes during a location detection scanning period, wherein the location detection scanning period is a period arranged in addition to a plurality of subfields for displaying data. Hereinafter, descriptions will be given under an assumption that the display panel is a PDP. However, one of ordinary skill in the art will appreciate that embodiments of the present invention may be adapted for other suitable types of displays.

The amplifying unit 20 amplifies the detection signal generated by the infrared sensor 10 to a suitable magnitude. The amplifying unit 20 may be an operational amplifier OP Amp, for example.

The LPF 30 removes high-frequency elements from the detection signal amplified by the amplifying unit 20. In other words, the LPF 30 filters high-frequency elements from the detection signal so that only low-frequency elements are passed. Here, the detection signal filtered by the LPF 30 will be described below in more detail.

FIG. 3A shows a PDP having 0 through $n^{th}$ scan electrodes, wherein the electronic pen 100 in three different cases respectively touches a row a-1 (1), a row a (3), and a location therebetween (2). When scanning signals are sequentially applied to detect the touch locations in the PDP, detection signals as shown in FIG. 3B are generated corresponding to the locations (1), (2), and (3).

The electronic pen 100 located at the locations (1) and (3) detects infrared rays having peak values when the location scanning signal is applied to a-$1^{th}$ scan electrode and a$^{th}$ scan electrode, respectively, therefore the electronic pen 100 may calculate the exact location at which the electronic pen is located. In other words, a detection signal has a peak value, such as first and third waveforms of FIG. 3B, and a location touched by the electronic pen 100 may be calculated according to a time point corresponding to the peak value.

However, when the electronic pen 100 touches the location (2), a detection signal thereof has a waveform corresponding to a second waveform of FIG. 3B. In other words, two peak values appear in the detection signal, and thus it is difficult to determine the touch location of the electronic pen 100 due to the two peak values and two time points corresponding to the two peak values.

When such detection signals are filtered by the LPF 30, waveforms as shown in FIG. 3C are formed. Referring to FIG. 3C, each of the detection signals corresponding to the locations (1), (2), and (3) has one peak value after being filtered, and time points corresponding to the peak values correspond to the locations touched by the electronic pen 100. Thus, a location touch by the electronic pen 100 may be accurately calculated via filtering performed by the LPF 30 even when the electronic pen 100 touches a location between scan electrodes, and thus resolution of detecting a touch location may be improved.

According to an embodiment, the location detecting unit 40 detects a location on a display panel touched by the electronic pen 100 based on a detection signal filtered of high frequency elements by the LPF 30. The location detecting unit 40 may include a comparing unit 41, a time measuring unit 42, and a location calculating unit 43.

The comparing unit 41 compares the detection signal filtered of high frequency elements by the LPF 30 to a reference value. According to the present embodiment, the reference value refers to a critical value at which it may be determined that the electronic pen 100 touches a display panel. The comparing unit 41 of the location detecting unit 40 compares a detection signal to a reference value, and the comparing unit 41 determines that the electronic pen 100 touches a display panel only when the detection signal has a value greater than the reference value.

The time measuring unit 42 measures a time difference between a time point at which scanning in a display panel started and a time point at which the infrared sensor 10 detected infrared rays. The scanning starting time point may be a time point at which scanning in a location detection scanning period begins, which is an arranged period for detecting a location touched. Alternatively, the scanning starting time point may be a time point at which a scanning signal is initially applied to scan electrodes during an address period or a time point at which a frame begins.

Further, the time point at which infrared rays are detected may be a time point at which a detection signal filtered by the LPF 30 has a peak value. In cases where the electronic pen 100 is located between scan electrodes, two portions having the same peak values may appear in the waveform of a detection signal. However, the waveform is converted to a waveform having one peak value after the detection signal is filtered, such as the second waveform of FIG. 3C. Thus, a time point corresponding to the peak value may be considered as the time point at which infrared rays are detected.

The location calculating unit 43 calculates a location touched by the electronic pen 100 according to the present embodiment based on the time difference measured by the time measuring unit 42. For example, when scanning signals are sequentially applied from a 0 row to an $n^{th}$ row, the time point at which the infrared rays are detected is delayed as the electronic pen 100 is located at a lower location. Thus, as the time difference becomes greater, it may be determined that the electronic pen 100 is at a lower location. Similarly, when calculating a horizontal location of the electronic pen 100, as the time difference becomes greater, it may be determined that the electronic pen 100 is at a location further right.

The communication unit 50 transmits information regarding a touch location detected by the location detecting unit 40 to the display panel. Based on the transmitted touch location information, an operation input by the electronic pen 100 may be performed on the display panel. For example, a cursor may follow locations touched by the electronic pen 100 or a line may be drawn along locations touched by the electronic pen 100. The communication unit 50 may employ wireless communication techniques, such as radio-frequency identification (RFID) and Bluetooth.

Hereinafter, a method using the electronic pen 100 to detect a touch location will be described with reference to FIG. 2.

Location detection scanning begins to detect a touch location on a PDP (operation S10). The location detection scanning refers to sequential application of location scanning signals to scan electrodes and address electrodes during a location detection scanning period, wherein the location detection scanning period is a period arranged in addition to a plurality of sub-fields within a frame.

When infrared rays are generated on a display panel due to the location detection scanning, the electronic pen 100 detects some of the infrared rays and generates a detection signal according to intensity of the detected infrared rays (operation S20).

The generated detection signal is amplified for easy calculation of a touch location (operation S30).

The amplified detection signal is filtered such that high-frequency elements thereof are removed (operation S40). Waveforms of filtered detection signals are described above with reference to FIGS. 3A through 3C.

The filtered detection signal is compared to a reference value (operation S50), and, if a value of the filtered detection signal is not greater than the reference value, it is determined that the display panel is not touched by the electronic pen 100.

In contrast, if a value of the filtered detection signal is greater than the reference value, it is determined that the display panel is touched by the electronic pen 100. Then, a time difference between a scanning starting time point and a time point at which the infrared rays are detected is calculated (operation S60), and an X coordinate and/or a Y coordinate of the touch location are calculated based on the calculated time difference.

In the case of a PDP, scan electrodes are arranged in a horizontal direction, whereas address electrode are arranged in a vertical direction. For example, when location scanning signals are sequentially applied to scan electrodes during a location detection scanning period and then location scanning signals are applied to address electrodes, an electronic pen detects infrared rays twice. Here, since a first detection signal is generated due to location scanning signals applied to scan electrodes, a time difference calculated based on the detection signal will be used to calculate the Y coordinate of the electronic pen 100. Furthermore, since a second detection signal is generated due to location scanning signals applied to address electrodes, a time difference calculated based on the detection signal will be used to calculate the X coordinate of the electronic pen 100.

A method of calculating X and Y coordinates will be described below in more detail. For example, when a PDP has a resolution of 480×360 pixels, the PDP may include 480 scan electrodes and 360 address electrodes. It is assumed that location scanning signals are sequentially applied to each of the electrodes every 1 μs, and, in this example, a detection signal has peak values at 200 μs and 495.5 μs after a location detection scanning period starts. In this case, it is calculated that the electronic pen 100 is located at the $200^{th}$ pixel from the top. Furthermore, since it takes 480 μs to apply location scanning signals to scan electrodes, the latter detection signal is detected 15.5 μs (495.5−480) after location scanning signals are initially applied to the address electrodes, and thus it is calculated that the electronic pen 100 is located between $15^{th}$ and $16^{th}$ pixels from the left.

According to the calculation, if the coordinate of the lower left corner of a PDP is (0,0) according to the rectangular coordinate system, the Y coordinate will decrease and the X coordinate will increase as the time difference becomes greater.

Although cases in which location scanning signals are applied to scan electrodes prior to address electrodes are described above, embodiments of the present invention are not limited thereto, and location scanning signals may be applied to address electrodes prior to scan electrodes.

Information regarding a touch location of an electronic pen calculated as described above is transmitted to the PDP (operation S80).

As described above, a touch location may be precisely detected according to an electronic pen and a method of detecting a touch location according to embodiments of the present invention, and thus resolution of detecting a touch location may be improved.

Figure 4:
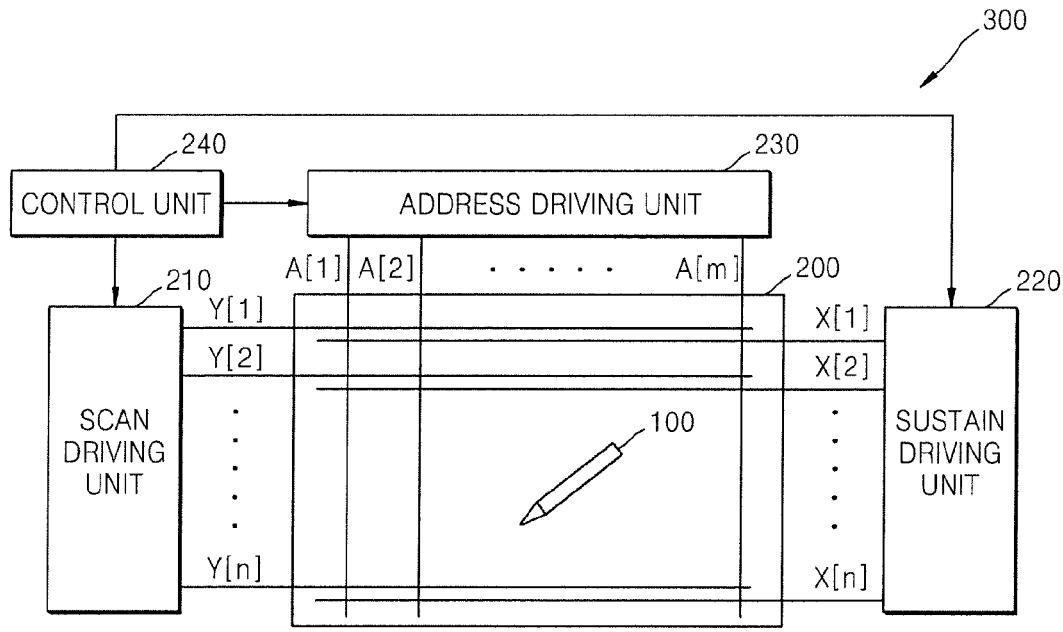
FIG. 4 is a schematic diagram showing a configuration of a touch location detecting apparatus according to an embodiment of the present invention.
Figure 5:
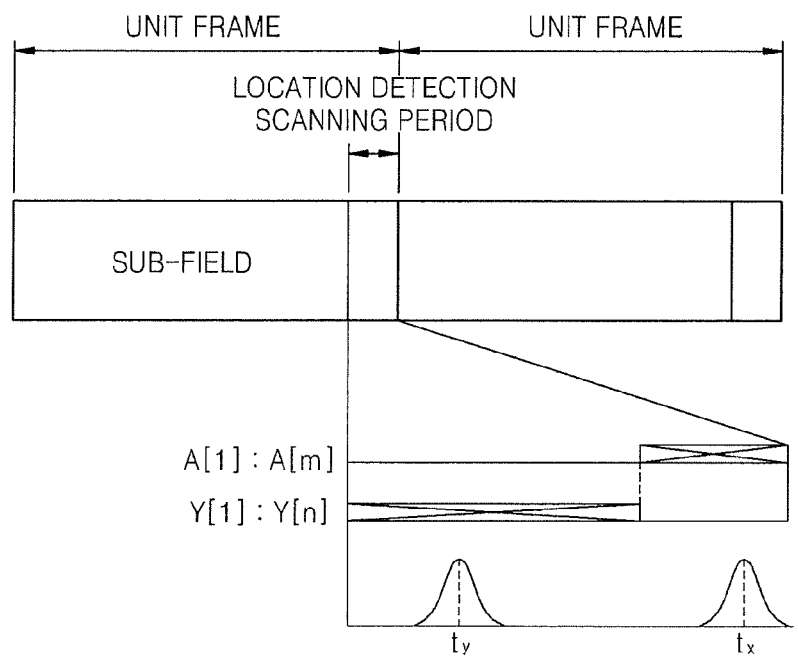
FIG. 5 is a diagram showing a method of operating a PDP shown in FIG. 4

FIG. 4 is a diagram showing a configuration of a touch location detecting apparatus 300 according to an embodiment of the present invention, and FIG. 5 is a diagram showing a method of operating a PDP shown in FIG. 4.

Referring to FIG. 4, the touch location detecting apparatus 300 includes the electronic pen 100 for detecting a touch location and a PDP 200. The PDP 200 includes a plurality of scan electrodes Y[1] through Y[n], a plurality of sustain electrodes X[1] through X[n], and a plurality of address electrodes A[1] through A[n]. The scan electrodes Y[1] through Y[n] and the sustain electrodes X[1] through X[n] are arranged to extend parallel to each other, and the address electrodes A[1] through A[n] extend perpendicularly across the scan electrodes Y[1] through Y[n] and the sustain electrodes X[1] through X[n]. Discharge cells may be defined at regions where the electrodes cross each other.

The PDP 200 may further include a scan driving unit 210, a sustain driving unit 220, and an address driving unit 230 for applying pulses to the electrodes for driving the PDP 200, and may further include a control unit 240 for controlling the driving units 210, 220, and 230.

The PDP 200 includes a plurality of sub-fields in a frame for displaying gradation, and may further include a location detection scanning period in addition to the plurality of sub-fields to detect a location touched by the electronic pen 100. Each of the plurality of sub-fields may include a reset period, an address period, and a sustain period.

Further, the location detection scanning period is a period during which location scanning signals are sequentially applied to the PDP to detect a location touched by the electronic pen 100. The location detection scanning may include an X coordinate scanning period and a Y coordinate scanning period. During the location detection scanning period, location scanning signals for detecting a location touched by the electronic pen 100 may be applied to the PDP 200. In detail, location scanning signals are sequentially applied by the address driving unit 230 to the address electrodes A[1] through A[n] during the X coordinate scanning period. Furthermore, location scanning signals are sequentially applied by the scan driving unit 210 to the scan electrodes Y[1] through Y[n] during the Y coordinate scanning period. According to the method of driving a touch location detecting apparatus according to the present embodiment, as shown in FIG. 5, location scanning signals are sequentially applied to the address electrodes A[1] through A[n] after location scanning signals are sequentially applied to the scan electrodes Y[1] through Y[n]. However, embodiments of the present invention are not limited thereto. In other words, the X coordinate scanning period may be performed prior to the Y coordinate scanning period. Alternatively, the X coordinate scanning period and the Y coordinate scanning period may be independently performed.

If location scanning signals are applied during location detection scanning period in the PDP 200, detection signals are generated twice as shown in FIG. 5. According to the present embodiment, since the Y coordinate scanning period is performed prior to the X coordinate scanning period, the Y coordinate of the electronic pen 100 may be calculated based on a time point $t_y$ corresponding to the peak value of a first detection signal. Furthermore, the X coordinate of the electronic pen 100 may be calculated based on a time point $t_x$ corresponding to the peak value of a second detection signal.

As described above, according to the one or more of the above embodiments of the present invention, resolution of detecting a touch location may be improved by detecting the touch location using the touch location detecting apparatus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electronic pen for detecting a touch location on a display panel by detecting infrared rays generated by the display panel, the electronic pen comprising:
   an infrared sensor configured to detect the infrared rays and to generate a detection signal;
   an amplifying unit configured to amplify the detection signal;
   a low pass filter configured to filter high-frequency elements from the amplified detection signal; and
   a location detecting unit configured to detect a detected touch location on the display panel touched by the electronic pen based on the filtered detection signal.

2. The electronic pen of claim 1, wherein the location detecting unit further comprises a comparing unit configured to compare the filtered detection signal to a reference value, and
   wherein the location detecting unit configured to determine that the electronic pen touches the display panel only when a value of the filtered detection signal is greater than the reference value.

3. The electronic pen of claim 2, wherein the location detecting unit further comprises:
   a time measuring unit configured to measure a time difference between a scanning starting time point at which scanning in the display panel started and a time point at which the infrared rays are detected; and
   a location calculating unit configured to calculate the detected touch location touched by the electronic pen based on the time difference measured by the time measuring unit.

4. The electronic pen of claim 3, wherein the time point at which the infrared rays are detected is a time point at which the filtered detection signal has a peak value.

5. The electronic pen of claim 1, further comprising a communication unit configured to transmit information regarding the detected touch location to the display panel.

6. The electronic pen of claim 1, wherein the display panel is a plasma display panel.

7. A method of detecting a location on a display panel touched by an electronic pen by detecting infrared rays generated by the display panel, the method comprising:
   detecting the infrared rays and generating a detection signal;
   amplifying the detection signal;
   filtering high-frequency elements from the amplified detection signal; and
   detecting a detected touch location touched by the electronic pen based on the filtered detection signal.

8. The method of claim 7, wherein the detecting of the location comprises comparing the filtered detection signal to a reference value, and determining that the display panel is touched by the electronic pen only when a value of the filtered detection signal is greater than the reference signal.

9. The method of claim 8, wherein the detecting of the location comprises:
measuring a time difference between a scanning starting time point at which scanning in the display panel started and a time point at which the infrared rays are detected; and
calculating the detected touch location touched by the electronic pen based on the measured time difference.

10. The method of claim 9, wherein the time point at which the infrared rays are detected is a time point at which the filtered detection signal has a peak value.

11. The method of claim 7, further comprising transmitting information regarding the detected touch location to the display panel.

12. The method of claim 7, wherein the display panel is a plasma display panel.

13. An apparatus for detecting a touch location, the apparatus comprising:
a plasma display panel including:
scan electrodes and sustain electrodes extending parallel with each other along a first direction; and
address electrodes extending along a second direction substantially perpendicular to the first direction of the scan electrodes and the sustain electrodes;
an electronic pen configured to detect a location touched by the electronic pen by detecting infrared rays generated by the plasma display panel,
wherein the electronic pen comprises:
an infrared sensor configured to detect the infrared rays and to generate a detection signal;
an amplifying unit configured to amplify the detection signal;
a low pass filter configured to filter high-frequency elements from the amplified detection signal; and
a location detecting unit configured to detect a detected touch location on the plasma display panel touched by the electronic pen based on the filtered detection signal.

14. The apparatus of claim 13, wherein a unit frame of the plasma display panel is divided into a plurality of sub-fields to display gradation and to provide a location detection scanning period.

15. The apparatus of claim 14, wherein the location detection scanning period comprises an X coordinate scanning period and a Y coordinate scanning period,
wherein location scanning signals are sequentially applied to the scan electrodes during the X coordinate scanning period, and
wherein location scanning signals are sequentially applied to the address electrodes during the Y coordinate scanning period.

16. The apparatus of claim 15, wherein the infrared sensor detects the infrared rays generated by the plasma display panel due to the application of the location scanning signals.

17. The apparatus of claim 16, wherein the location detecting unit further comprises a comparing unit configured to compare the filtered detection signal to a reference value, and
wherein the location detecting unit configured to determine that the electronic pen touches the plasma display panel only when a value of the filtered detection signal is greater than the reference value.

18. The apparatus of claim 17, wherein the location detecting unit further comprises:
a time measuring unit configured to measure a time difference between a scanning starting time point at which scanning in the plasma display panel started and a time point at which the infrared rays are detected; and
a location calculating unit configured to calculate the location touched by the electronic pen based on a time difference measured by the time measuring unit.

19. The apparatus of claim 18, wherein the time point at which the infrared rays are detected is a time point at which the filtered detection signal has a peak value, and
the scanning starting time point is a time point at which scanning starts for either the X coordinate scanning period or the Y coordinate scanning period.

20. The apparatus of claim 13, further comprising a communication unit configured to transmit information regarding the detected touch location to the plasma display panel.

* * * * *